US 7,877,098 B2

(12) United States Patent
Ryu et al.

(10) Patent No.: US 7,877,098 B2
(45) Date of Patent: Jan. 25, 2011

(54) METHOD OF DETERMINING CELL RESELECTION IN MOBILE COMMUNICATION TERMINAL AND APPARATUS THEREFOR

(75) Inventors: Dong-Won Ryu, Seoul (KR); Yu-Shin Kim, Osan-si (KR); Joo-Hyun Lee, Paju-si (KR)

(73) Assignee: Samsung Electronics Co., Ltd (KR)

( * ) Notice: Subject to any disclaimer, the term of this patent is extended or adjusted under 35 U.S.C. 154(b) by 898 days.

(21) Appl. No.: 11/801,311

(22) Filed: May 9, 2007

(65) Prior Publication Data

US 2007/0287461 A1 Dec. 13, 2007

(30) Foreign Application Priority Data

Jun. 13, 2006 (KR) ...................... 10-2006-0052821

(51) Int. Cl.
*H04W 40/00* (2009.01)
(52) U.S. Cl. ................. 455/446; 455/452.2; 455/456.1; 370/331; 370/338
(58) Field of Classification Search ........... 455/69, 455/425, 436–437, 440, 442, 446
See application file for complete search history.

(56) References Cited

U.S. PATENT DOCUMENTS

| 6,195,551 | B1 * | 2/2001 | Kim et al. ................. 455/436 |
| 6,539,221 | B1 * | 3/2003 | Vasudevan et al. .......... 455/423 |
| 6,574,203 | B2 | 6/2003 | Bernstein et al. |
| 2003/0076796 | A1 * | 4/2003 | Kondo ........................ 370/332 |
| 2005/0043062 | A1 * | 2/2005 | Ahn et al. ................. 455/560 |
| 2005/0107106 | A1 * | 5/2005 | Valkealahti et al. ......... 455/522 |

FOREIGN PATENT DOCUMENTS

| KR | 10-2000-0009979 | 2/2000 |
| KR | 1020050022462 | 3/2005 |
| KR | 1020050073197 | 7/2005 |

\* cited by examiner

*Primary Examiner*—Pierre-Louis Desir
*Assistant Examiner*—Inder P Mehra
(74) *Attorney, Agent, or Firm*—The Farrell Law Firm, LLP

(57) ABSTRACT

A method of determining cell reselection in a mobile communication terminal and an apparatus therefor are provided. The method includes receiving system information to calculate a threshold value in consideration of channel quality, a cell reselection weight value, and a cell reselection reference value; and determining whether to perform cell reselection using the threshold value in consideration of the channel quality, the cell reselection weight value, and the cell reselection reference value in a specific wireless environment.

14 Claims, 4 Drawing Sheets

METHOD OF DETERMINING CELL RESELECTION IN MOBILE COMMUNICATION TERMINAL AND APPARATUS THEREFOR

PRIORITY

This application claims priority under 35 U.S.C. §119(a) to a Korean Patent Application filed in the Korean Intellectual Property Office on Jun. 13, 2006 and assigned Serial No. 2006-52821, the contents of which are incorporated herein by reference.

BACKGROUND OF THE INVENTION

1. Field of the Invention

The present invention relates generally to a mobile communication terminal, and in particular, to a method and an apparatus for increasing battery life by reducing the number of times of unnecessary cell reselection in a wireless environment in a range that does not affect communications between a terminal and a network in consideration of channel quality as well as a receiving signal strength when cell reselection is determined by a mobile communication terminal.

2. Description of the Related Art

Since mobile communication services were introduced, studies on a handover technology and a cell reselection technology for guaranteeing the mobility of a mobile communication terminal in a wireless network have been continuously performed.

The handover or cell reselection that allows communications to be maintained when the mobile communication terminal moves from a serving cell to a neighboring cell occurs when the wireless environment of the neighboring cell is better than the wireless environment of the serving cell during the movement of the mobile communication terminal. A difference between handover and cell reselection lies in that handover occurs when the mobile communication terminal occupies a traffic channel and that cell reselection occurs in an idle mode where the mobile communication terminal does not occupy the traffic channel.

In general, the term "cell reselection" is used for a Global System for Mobile communications (GSM) method; however, the term "idle handover" is used instead of cell reselection for a Code Division Multiple Access (CDMA) method.

Here, the cell reselection determining method of the GSM method widely used in Europe and other areas will be described below.

FIG. 1 is a flow diagram illustrating conventional processes of determining cell reselection in a GSM method.

In FIG. 1, the mobile communication terminal periodically sets a cell reselection reference value required for step 102. The cell reselection reference value serves as reference when it is determined whether to perform cell reselection. The mobile communication terminal calculates the cell reselection reference value (hereinafter, C2_serving cell) of the serving cell and the cell reselection reference value (hereinafter, C2_neighboring cell) of the neighboring cell using Equation 1 and Equation 2 every five seconds and while using the system information received from a base station every five seconds in order to calculate the required cell reselection reference value.

$$C2\_\text{serving cell} = C1 + \text{CELL\_RESELECT\_OFFSET} \quad (1)$$

$$C2\_\text{neighboring cell} = C1 + \text{CELL\_RESELECT\_OFFSET} - \text{TEMPORARY OFFSET} * H(\text{PENALTY\_TIME} - T) \quad (2)$$

In Equation (1) and Equation (2), C1 indicates a path loss reference value, the T indicates a timer of a cell in a neighboring cell list of the mobile communication terminal, CELL_ RESELECT_OFFSET, TEMPORARY_OFFSET, and PENALTY_TIME are unique system information items that each cell has, and H(x) indicates a function that is 0 when x<0 and 1 when x≧0.

When C1 is reduced to no more than 0 (zero) for five seconds, it means that the path loss of the cell is large or that the receiving signal of the mobile communication terminal is small.

When T is smaller than PENALTY_TIME, H(x) is 1 so that the cell reselection reference value of the neighboring cell is reduced and that there is a high chance of not selecting the neighboring cell as a serving cell. Conversely, when T is larger than PENALTY_TIME, H(x) is 0 so that the cell reselection reference value of the neighboring cell becomes similar to the cell reselection reference value of the serving cell and that there is a high chance of selecting the neighboring cell as a serving cell.

Then, the process goes to step 104 to compare the cell reselection reference value of the serving cell with the cell reselection reference value of the neighboring cell, and proceeds to step 106 when it is determined that the cell reselection reference value of the serving cell is larger than the cell reselection reference value of the neighboring cell in which the cell reselection is not performed but the current serving cell is maintained as it is, and then returns to step 102. In this case, the receiving signal of the serving cell is larger than the receiving signal of the neighboring cell or the path loss of the cell is small so that it is not necessary to perform cell reselection.

When the cell reselection reference value of the serving cell is smaller than the cell reselection reference value of the neighboring cell, the process proceeds to step 108 to reselect the neighboring cell as a serving cell. In this case, the receiving signal of the serving cell is smaller than the receiving signal of the neighboring cell or the path loss of the cell is large so that it is necessary to reselect a serving cell.

When the serving cell is reselected, the process proceeds to step 110 to update system information in the selected serving cell and returns to step 102 to initialize the reselection of a cell.

In a conventional art, the mobile communication terminal calculates the cell reselection reference value to select the cell that has the large cell reselection reference value as a serving cell regardless of the wireless environment. However, in this case, in an environment where the receiving signal is in a desirable state so that the accessing serving cell can serve enough, the mobile communication terminal selects the neighboring cell that has the large cell reselection reference value as a serving cell.

The mobile communication terminal consumes battery power in order to receive and decode system information on a new serving cell in the cell reselection processes. Therefore, the mobile communication terminal consumes a larger amount of battery power according to the number of times the cell reselection increases such that the use time of a battery is reduced. In particular, the mobile communication terminal is used in a micro-cell environment with a radius of about 500 m and 1 km in order to serve many users in a large city. In the micro-cell environment, the mobile communication more frequently performs cell reselection so that the power consumption of the battery increases.

Therefore, a method of reducing the power consumption of the battery by not performing unnecessary cell reselection processes in consideration of current channel quality and an apparatus therefor are required.

SUMMARY OF THE INVENTION

An object of the present invention is to substantially solve at least the above problems and/or disadvantages and to provide at least the advantages below. Accordingly, an object of the present invention is to provide an apparatus and method of increasing the use time of a battery by reducing the number of times of unnecessary cell reselection in a mobile communication terminal.

Another object of the present invention is to provide an apparatus and a method of determining cell reselection in consideration of current channel quality in a mobile communication terminal and an apparatus therefor.

In order to achieve the above objects, according to one aspect of the present invention, a method of determining cell reselection in a mobile communication terminal includes receiving system information to calculate a threshold value in consideration of channel quality, a cell reselection weight value, and a cell reselection reference value and determining whether to perform cell reselection using the threshold value in consideration of the channel quality, the cell reselection weight value, and the cell reselection reference value in a specific wireless environment.

According to another aspect of the present invention, a mobile communication terminal apparatus for determining cell reselection includes a controller for providing system information received from a receiver to a cell reselection determiner to determine whether to perform cell reselection and a cell reselection determiner for determining whether to perform cell reselection using a threshold value in consideration of channel quality, a cell reselection weight value, and a cell reselection reference value and for informing the controller the determination result.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENTS

Preferred embodiments of the present invention will be described herein below with reference to the accompanying drawings. In the following description, well-known functions or constructions are not described in detail since they would obscure the invention with unnecessary detail.

Figure 1:
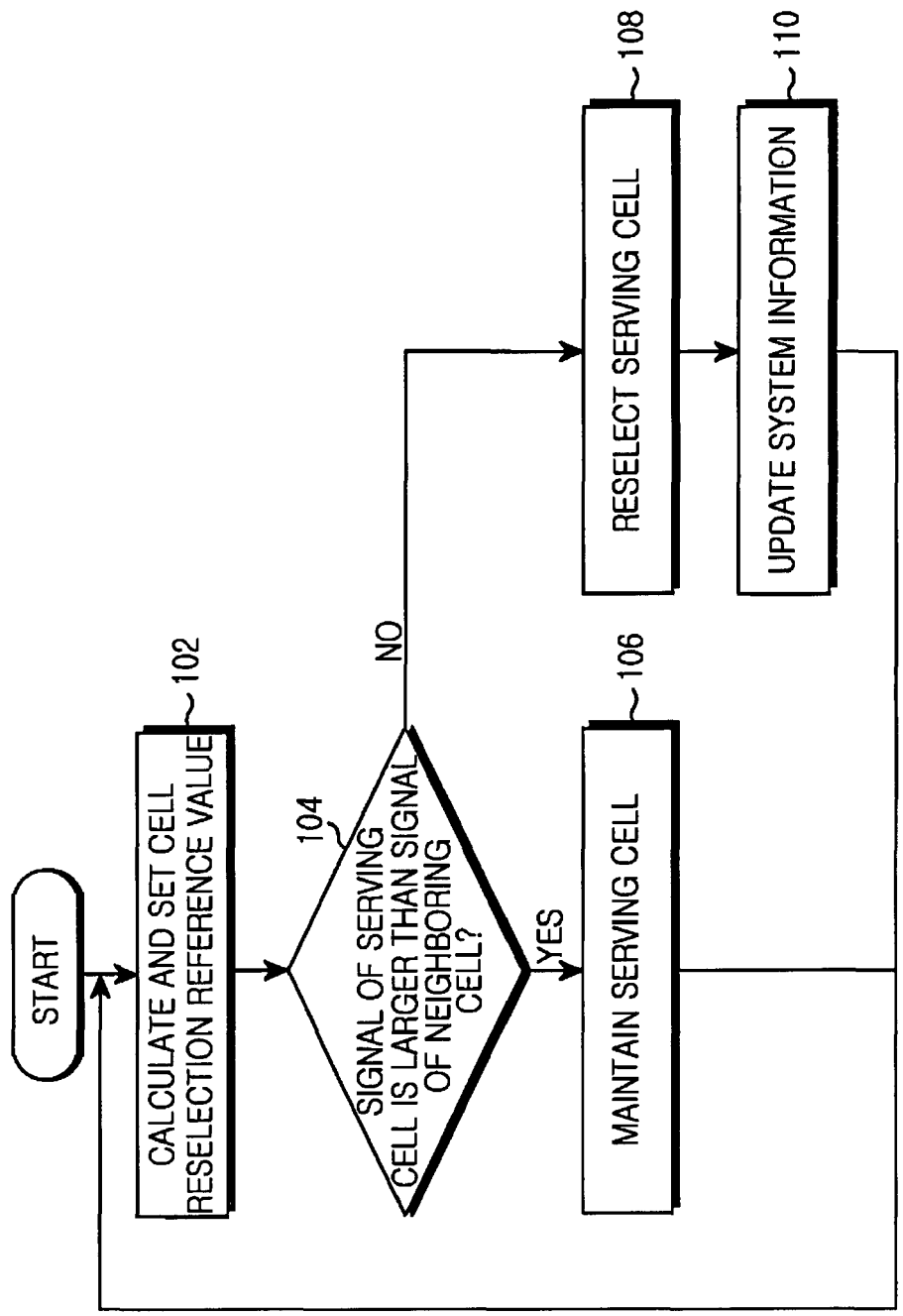
FIG. 1 is a flow diagram illustrating conventional processes of determining cell reselection in a Global System for Mobile communications (GSM) method.
Figure 2:
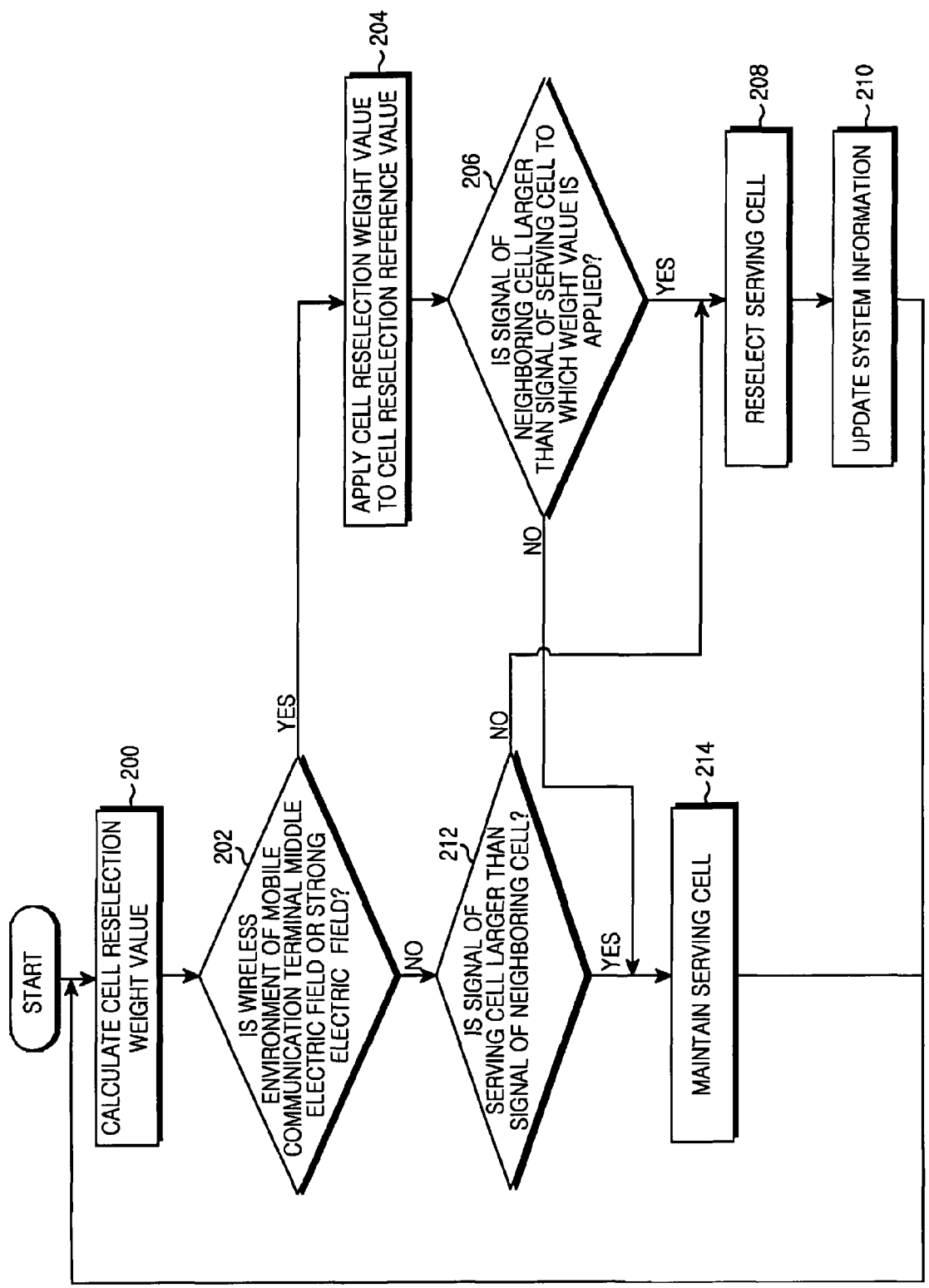
FIG. 2 is a flow diagram illustrating processes of determining cell reselection in a GSM method according to the present invention.

FIG. 2 is a flow diagram illustrating processes of determining cell reselection in a GSM method according to the present invention.

In FIG. 2, a mobile communication terminal calculates and sets a cell reselection reference value, a threshold value in consideration of channel quality, and a cell reselection weight value that are required in a step 200. The mobile communication terminal calculates the cell reselection reference value, the threshold value in consideration of the channel quality, and the cell reselection weight value using the system information received from a base station every five seconds in order to set a necessary cell reselection reference value.

Here, the cell reselection reference value of a serving cell and the cell reselection reference value of a neighboring cell are calculated using the Equation (1) and the Equation (2) and the threshold value (hereinafter, T_criterion) in consideration of the channel quality is calculated by Equation (3).

$$T\_criterion = Threshold + IRXQUAL \quad (3)$$

In Equation (3), Threshold is the threshold value of a receiving signal and has a regularized integer value that is not dBm (for example, T_criterion value is obtained by the regularized integer value 25 when Threshold is −85 dBm) and IRXQUAL changes the threshold value in accordance with a Signal to Noise Ratio (SNR) and is determined by Table 1 below.

The Table 1 defines mappings between RXQUAL and IRXQUAL according to the SNR.

TABLE 1

| Range of SNR[dBm] | RXQUAL | IRXQUAL |
|---|---|---|
| ~13 | 0 | 0 |
| 13~10 | 1 | 0 |
| 10~7 | 2 | 1 |
| 7~4 | 3 | 2 |
| 4~1 | 4 | 4 |
| 1~−2 | 5 | 5 |
| −2~−5 | 6 | 8 |
| −5~ | 7 | 10 |

In the Table 1, the RXQUAL indicates a value obtained by regularizing what percent of error exists when a signal is received.

Accordingly, as the SNR is reduced, IRXQUAL increases so that T_criterion increases, in which the threshold value is set to be large in consideration of cases where the magnitude of the receiving signal in the wireless environment is large, and the channel quality is low. Conversely, as the SNR increases, IRXQUAL is reduced so that T_criterion is close to the threshold value.

Then, the process goes to step 202 to determine whether the wireless environment of the mobile communication terminal is a weak electric field or middle and strong electric fields. According to the present invention, it is determined that the wireless environment of the mobile communication terminal is the middle and strong electric fields when the cell reselection reference value of the serving cell is larger than the threshold value T_criterion in consideration of the channel quality and when the cell reselection reference value of the neighboring cell is larger than the threshold value T_criterion in consideration of the channel quality. It is then determined that the wireless environment of the mobile communication terminal is the weak electric field when the cell reselection reference value of the serving cell or the cell reselection reference value of the neighboring cell is smaller than the threshold value T_criterion in consideration of the channel quality. In the weak electric field, the receiving signal level of the mobile communication terminal is no more than −95 dBm. In the middle electric field, the receiving signal level of the mobile communication terminal is between −95 dBm and −80 dBm. In the strong electric field, the receiving signal level of the mobile communication terminal is no less than −80 dBm.

When it is determined that the wireless environment of the mobile communication terminal is the middle and strong electric fields, the process proceeds to step 204 to add the cell reselection weight value to the cell reselection reference value. Here, the cell reselection weight value is a subtraction of the threshold value in consideration of the channel quality from the cell reselection reference value of the serving cell.

The process then goes to step 206 and then to step 208 when it is determined that the cell reselection reference value of the neighboring cell is larger than the sum of the cell reselection reference value of the serving cell and the weight value, in which the neighboring cell is reselected as a serving cell.

The process then goes to step 210 to update the system information of a new serving cell, and then to return to step 200.

In the step 206, when it is determined that the cell reselection reference value of the neighboring cell is not larger than the sum of the cell reselection reference value of the serving cell and the weight value, the process proceeds to a step 214 which instructs not to perform cell reselection, to maintain the current serving cell, and to return to the step 200 that is the initial state of the process according to the present invention. Therefore, the mobile communication terminal does not perform cell reselection in a cell where channel quality is satisfied although the signal of the neighboring cell is larger than the signal of the serving cell by the cell reselection weight value.

In step 202, when it is determined that the wireless environment of the mobile communication terminal is the weak electric field, the process proceeds to step 212 to compare the cell reselection reference value of the serving cell and the cell reselection reference value of the neighboring cell with each other, and returns to step 208 when it is determined that the cell reselection reference value of the serving cell is smaller than the cell reselection reference value of the neighboring cell, in which the serving cell is reselected, and proceeds to step 210 in which the system information is updated.

In step 212, when it is determined that the cell reselection reference value of the serving cell is larger than the cell reselection reference value of the neighboring cell, the process proceeds to step 214 which instructs not to perform cell reselection, to maintain the current serving cell as it is, and to return to step 200 that is the initial state of the process according to the present invention.

Figure 3A:
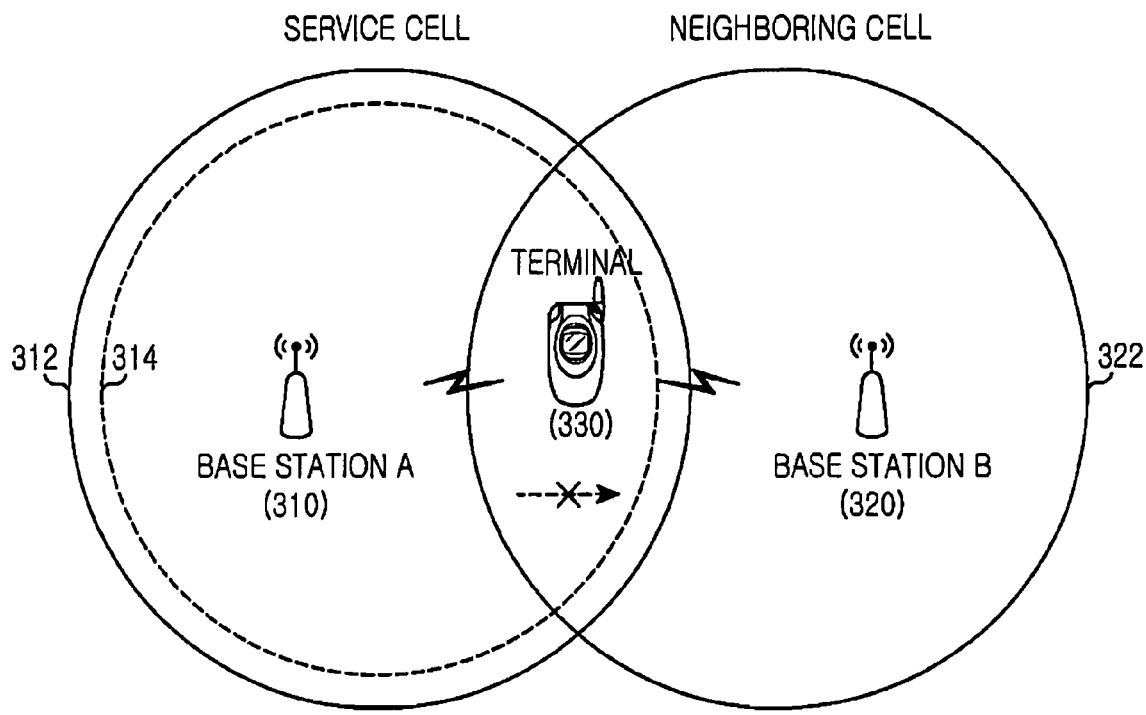
FIG. 3A illustrates the determination of the cell reselection in the GSM method when the cell reselection reference value of a serving cell is smaller than the cell reselection reference value of a neighboring cell and channel quality is satisfactory according to the present invention.

FIG. 3A illustrates the determination of the cell reselection in the GSM method when the cell reselection reference value of a serving cell is smaller than the cell reselection reference value of a neighboring cell and channel quality is satisfactory according to the present invention.

In FIG. 3A, in the environment where the cell reselection reference value of the serving cell is smaller than the cell reselection reference value of the neighboring cell and the channel quality is satisfied, a mobile communication terminal 330 in an overlapping region between a base station A 310 in charge of services in a coverage 312 of the serving cell in accordance with the T_criterion and a base station B 320 in charge of services in a coverage 322 of the neighboring cell determines cell reselection.

The mobile communication terminal 330 does not perform cell reselection since the channel quality is satisfactory enough although the cell reselection reference value of the neighboring cell is larger than the cell reselection reference value of the serving cell when the mobile communication terminal 330 is in a coverage 314 of the serving cell in accordance with the T_criterion in consideration of the channel quality. This is because the weight value is added to the cell reselection reference value of the serving cell that guarantees the channel quality so that the cell reselection reference value of the serving cell is larger than the cell reselection reference value of the neighboring cell.

Figure 3B:
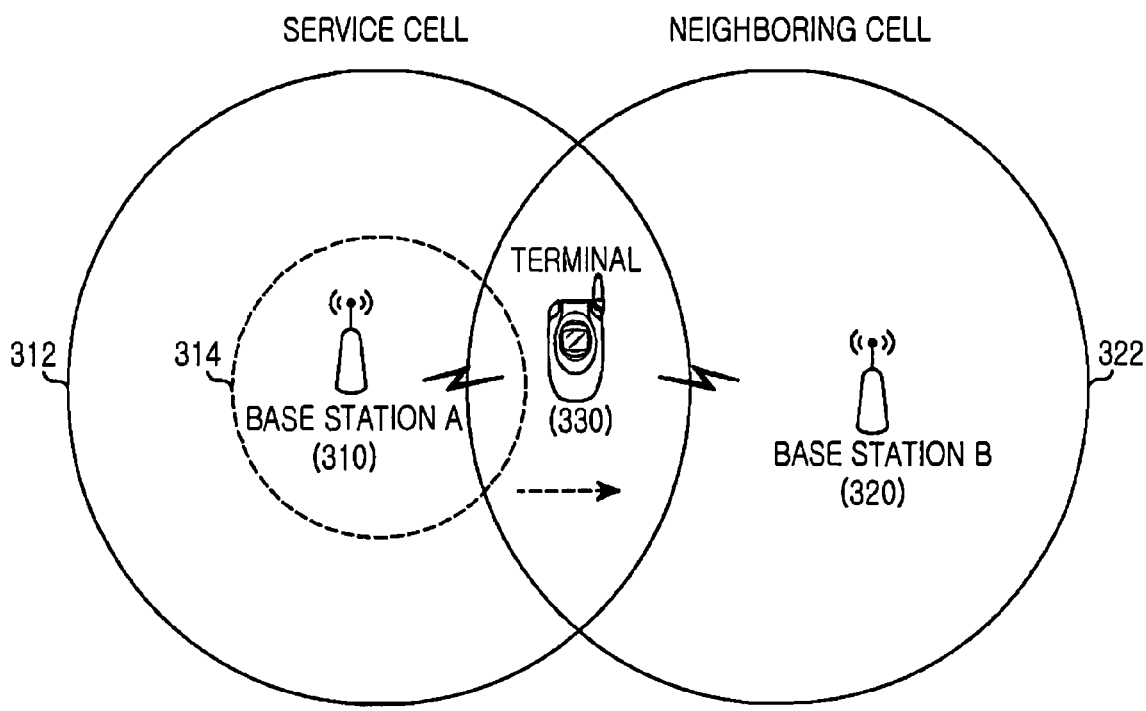
FIG. 3B illustrates the determination of the cell reselection in the GSM method when the cell reselection reference value of the serving cell is smaller than the cell reselection reference value of the neighboring cell and channel quality is not satisfactory according to the present invention.

FIG. 3B illustrates the determination of the cell reselection in the GSM method when the cell reselection reference value of the serving cell is smaller than the cell reselection reference value of the neighboring cell and channel quality is not satisfactory according to the present invention.

In FIG. 3B, in the environment where the cell reselection reference value of the serving cell is smaller than the cell reselection reference value of the neighboring cell and the channel quality is not satisfactory, the mobile communication terminal 330 in the overlapping region between the base station A 310 in charge of services in the coverage 312 of the serving cell in accordance with the T_criterion and the base station B 320 in charge of services in the coverage 322 of the neighboring cell determines cell reselection.

The mobile communication terminal 330 reselects the neighboring cell as a serving cell when the mobile communication terminal 330 is in the outside of coverage 314 in accordance with the T_criterion in consideration of the channel quality and when the cell reselection reference value of the neighboring cell is larger than the cell reselection reference value of the serving cell.

Figure 4:
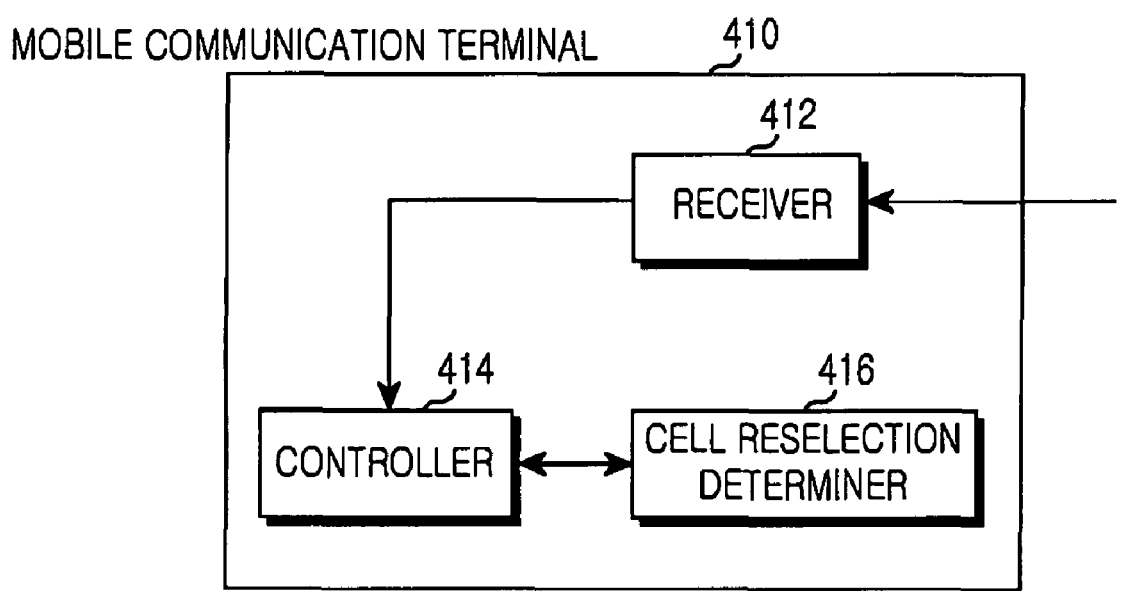
FIG. 4 is a block diagram of an apparatus for determining the cell reselection in the GSM method according to the present invention.

FIG. 4 is a block diagram of an apparatus for determining the cell reselection in the GSM method according to of the present invention.

In FIG. 4, a receiver 412 of a mobile communication terminal 410 receives system information from a base station. A controller 414 provides the system information received from the receiver 412 to a cell reselection determiner 416 and to determine whether to perform cell reselection. In accordance with the instruction of the controller 414, the cell reselection determiner 416 calculates a threshold value in consideration of channel quality and a cell reselection weight value using the system information, determines a current wireless environment to apply the cell reselection weight value to a cell reselection reference value when it is determined that the current wireless environment is middle and strong electric fields and to determine whether the serving cell is to be reselected without applying the cell reselection weight value to the cell reselection reference value, and informs the controller 414 of the determination result.

As described above, in the mobile communication terminal 410 that determines cell reselection, it is possible to effectively perform cell reselection in the wireless channel environment that changes in accordance with time and in consideration of the channel quality as well as the magnitude of the receiving signal.

The cell reselection weight value is provided so that it is possible to reduce the number of times of unnecessary cell reselection in the wireless environment of the middle and strong electric fields in the range that does not affect communications between the terminal and the network and to thus increase the use time of a battery.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A method of determining cell reselection in a mobile communication terminal, comprising:
   determining a threshold value (T_criterion) in consideration of channel quality, a cell reselection weight value, and a cell reselection reference value; and
   determining whether to perform cell reselection using the threshold value in consideration of the channel quality, the cell reselection weight value, and the cell reselection reference value in a specific wireless environment,
   wherein in the specific wireless environment, the cell reselection reference value is larger than the threshold value in consideration of the channel quality, and
   wherein in the specific wireless environment, cell reselection is performed when the cell reselection reference value of a neighboring cell is larger than a sum of the cell reselection reference value of a serving cell and the cell reselection weight value, and a current serving cell is maintained when the cell reselection reference value of the neighboring cell is equal to or smaller than the sum of the cell reselection reference value of the serving cell and the cell reselection weight value.

2. The method of claim 1, wherein the threshold value in consideration of the channel quality is calculated by:

$T\_criterion = Threshold + IRXQUAL;$ where Threshold is the threshold value of a receiving signal and has a regularized integer value that is not dBm and IRXQUAL changes the threshold value in accordance with a signal to noise ratio (SNR).

3. The method of claim 2, wherein IRXQUAL is defined by the SNR as in the following table:

| Range of SNR[dBm] | RXQUAL | IRXQUAL |
|---|---|---|
| ~13 | 0 | 0 |
| 13~10 | 1 | 0 |
| 10~7 | 2 | 1 |
| 7~4 | 3 | 2 |
| 4~1 | 4 | 4 |
| 1~-2 | 5 | 5 |
| -2~-5 | 6 | 8 |
| -5~ | 7 | 10 | where the RXQUAL indicates a value obtained by regularizing what percent of error exists when a signal is received.

4. The method of claim 1, wherein the cell reselection weight value is calculated by:

$\alpha(\text{the cell reselection weight value}) = C2 \text{ of the serving cell} - T\_criterion;$ where C2 indicates the cell reselection reference value and T_criterion indicates the threshold value in consideration of the channel quality.

5. The method of claim 1, wherein the cell reselection reference value of the serving cell and the cell reselection reference value of the neighboring cell are calculated by:

The cell reselection reference value of the serving cell=C1+CELL_RESELECT_OFFSET; and in The cell reselection reference value of the neighboring cell=C1+CELL_RESELECT_OFFSET−TEMPORARY OFFSET*$H$(PENALTY_TIME−$T$);

where C1 indicates a path loss reference value, T indicates a timer of a cell in a neighboring cell list of the mobile communication terminal, CELL_RESELECT_OFFSET, TEMPORARY_OFFSET, and PENALTY_TIME are unique system information items that each cell has, and H(x) indicates a function that has 0 when x<0 and 1 when x≧0.

6. A mobile communication terminal apparatus for determining cell reselection, comprising:
   a controller for providing system information received from a receiver to a cell reselection determiner to determine whether to perform cell reselection; and
   a cell reselection determiner for determining whether to perform cell reselection using a threshold value in consideration of channel quality, a cell reselection weight value, and a cell reselection reference value by the instruction of the controller and for informing the controller the determination result,
   wherein in the cell reselection determiner, the cell reselection reference value is larger than the threshold value in consideration of the channel quality, and
   wherein in the cell reselection determiner, cell reselection is performed when the cell reselection reference value of a neighboring cell is larger than a sum of the cell reselection reference value of a serving cell and the cell reselection weight value, and a current serving cell is maintained when the cell reselection reference value of the neighboring cell is less than or equal to the sum of the cell reselection reference value of the serving cell and the cell reselection weight value.

7. The apparatus of claim 6, wherein the threshold value in consideration of the channel quality is calculated by:

$T\_criterion = Threshold + IRXQUAL;$ where Threshold is the threshold value of a receiving signal and has a regularized integer value that is not dBm and IRXQUAL changes the threshold value in accordance with a Signal to Noise Ratio (SNR).

8. The apparatus of claim 7, wherein IRXQUAL is defined by the SNR as illustrated in the following table

| Range of SNR[dBm] | RXQUAL | IRXQUAL |
|---|---|---|
| ~13 | 0 | 0 |
| 13~10 | 1 | 0 |
| 10~7 | 2 | 1 |
| 7~4 | 3 | 2 |
| 4~1 | 4 | 4 |
| 1~-2 | 5 | 5 |
| -2~-5 | 6 | 8 |
| -5~ | 7 | 10 | where the RXQUAL indicates a value obtained by regularizing what percent of error exists when a signal is received.

9. The apparatus of claim 6, wherein the cell reselection weight value is calculated by:

$\alpha(\text{the cell reselection weight value}) = C2 \text{ of the serving cell} - T\_criterion;$ where C2 indicates the cell reselection reference value and T_criterion indicates the threshold value in consideration of the channel quality.

10. The apparatus of claim 6, wherein the cell reselection reference value of the serving cell and the cell reselection reference value of the neighboring cell are calculated by:

The cell reselection reference value of the serving cell=$C1$+CELL_RESELECT_OFFSET; and The cell reselection reference value of the neighboring cell=$C1$+CELL_RESELECT_OFFSET−TEMPORARY OFFSET*$H$(PENALTY_TIME−$T$);

where C1 indicates a path loss reference value, T indicates a timer of a cell in a neighboring cell list of the mobile communication terminal, CELL_RESELECT_OFFSET, TEMPORARY_OFFSET, and PENALTY_TIME are unique system information items that each cell has, and H(x) indicates a function that has 0 when x<0 and 1 when x≧0.

11. A method of determining cell reselection in a mobile communication terminal, comprising:
 determining whether to perform cell reselection using a threshold value (T_criterion) in consideration of a channel quality, a cell reselection weight value, and a cell reselection reference value in a wireless environment,
 wherein in the specific wireless environment, the cell reselection reference value is larger than the threshold value in consideration of the channel quality, and
 wherein cell reselection is determined when the cell reselection reference value of a neighboring cell is larger than a sum of the cell reselection reference value of a serving cell and the cell reselection weight value.

12. The method of claim 11, wherein the threshold value in consideration of the channel quality is calculated by:

$T$_criterion=Threshold+IRXQUAL;

where Threshold is the threshold value of a receiving signal and has a regularized integer value that is not dBm and IRXQUAL changes the threshold value in accordance with a Signal to Noise Ratio (SNR).

13. A mobile communication terminal of determining cell reselection, comprising:
 means for determining whether to perform cell reselection using a threshold value (T_criterion) in consideration of a channel quality, a cell reselection weight value, and a cell reselection reference value in a wireless environment,
 wherein in the specific wireless environment, the cell reselection reference value is larger than the threshold value in consideration of the channel quality, and
 wherein cell reselection is determined when the cell reselection reference value of a neighboring cell is larger than a sum of the cell reselection reference value of a serving cell and the cell reselection weight value.

14. The mobile communication terminal of claim 13, wherein the threshold value in consideration of the channel quality is calculated by:

$T$_criterion=Threshold+IRXQUAL;

where Threshold is the threshold value of a receiving signal and has a regularized integer value that is not dBm and IRXQUAL changes the threshold value in accordance with a Signal to Noise Ratio (SNR).

* * * * *